US012112733B2

United States Patent
Tachi (10) Patent No.: US 12,112,733 B2
(45) Date of Patent: Oct. 8, 2024

(54) COMMUNICATION SUPPORT SYSTEM

(71) Applicant: Alps Alpine Co., LTD., Tokyo (JP)

(72) Inventor: Ryosuke Tachi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 104 days.

(21) Appl. No.: 18/113,225

(22) Filed: Feb. 23, 2023

(65) Prior Publication Data
US 2023/0274723 A1    Aug. 31, 2023

(30) Foreign Application Priority Data
Feb. 25, 2022    (JP) .................. 2022-027557

(51) Int. Cl.
| | | |
|---|---|---|
| G10K 11/178 | (2006.01) | |
| B60N 2/005 | (2006.01) | |
| B60N 2/90 | (2018.01) | |

(52) U.S. Cl.
CPC ........ G10K 11/17817 (2018.01); B60N 2/005 (2013.01); B60N 2/90 (2018.02); G10K 11/17815 (2018.01); G10K 11/17823 (2018.01); G10K 11/17825 (2018.01); G10K 11/17881 (2018.01); *G10K 2210/1282* (2013.01); *G10K 2210/3022* (2013.01);
(Continued)

(58) Field of Classification Search
CPC .......... G10L 21/0208; G10K 11/17817; G10K 11/178; G10K 11/17854; G10K 2210/505; G10K 11/17881; H04M 9/08; H04M 9/082; H04M 1/60; H04R 2499/13
See application file for complete search history.

(56) References Cited

U.S. PATENT DOCUMENTS 7,171,003 B1 * 1/2007 Venkatesh ............. H04M 9/082
381/86
2002/0071573 A1    6/2002 Finn
(Continued)

FOREIGN PATENT DOCUMENTS

| JP | 2002-051392 | 2/2002 |
|---|---|---|
| JP | 2010-016564 | 1/2010 |
| JP | 2010-163054 | 7/2010 |

OTHER PUBLICATIONS

Extended European Search Report issued Jun. 27, 2023 in corresponding European Patent Application No. 23 15 4405.

*Primary Examiner* — Kile O Blair
(74) *Attorney, Agent, or Firm* — Crowell & Moring LLP (57) ABSTRACT

A noise canceling adaptive filter outputs, from a front seat speaker, a noise canceling sound generated by applying a transfer function X(z) adapted by an adaptive operation using an output of a front seat microphone as an error to an output sound of a sound source apparatus. An output of the front seat microphone is added to an output of an audio feedback canceling filter by a second adder, added to an output sound of the sound source apparatus by a third adder, and output from a rear seat speaker. The audio feedback canceling filter applies a transfer function X'(z) and a transfer function C^(z) on an output of the second adder and outputs a resultant. The transfer function C^(z) corresponds to a transfer function C(z) from the front seat speaker to the front seat microphone. In synchronization control, the transfer function X(z) is set as the transfer function X'(z).

7 Claims, 4 Drawing Sheets

(52) U.S. Cl.
CPC ............... *G10K 2210/3026* (2013.01); *G10K 2210/3027* (2013.01); *G10K 2210/3028* (2013.01); *G10K 2210/3044* (2013.01); *G10K 2210/3046* (2013.01); *G10K 2210/3055* (2013.01); *G10K 2210/505* (2013.01)

(56) References Cited

U.S. PATENT DOCUMENTS

| | | | |
|---|---|---|---|
| 2013/0179163 A1* | 7/2013 | Herbig | ............... G10L 21/0208 381/86 |
| 2021/0006900 A1 | 1/2021 | Ohashi | |

* cited by examiner

COMMUNICATION SUPPORT SYSTEM

BACKGROUND

The present application claims priority to Japanese Patent Application Number 2022-027557, filed Feb. 25, 2022, the entirety of which is hereby incorporated by reference.

BACKGROUND

1. Field of the Disclosure

The present disclosure relates to a technique for supporting communication by speech between users in different areas.

2. Description of the Related Art

As a technique for supporting communication by speech between users in different areas, a microphone is used to capture speech voice of a user seated in a first seat of a car. The speech voice, whose gain is adjusted so that a user in a second seat may hear the speech voice clearly, is synthesized with output sound, such as music output by an audio device, and output from a speaker. See, for example, JP 2002-51392 A.

Figure 4A:
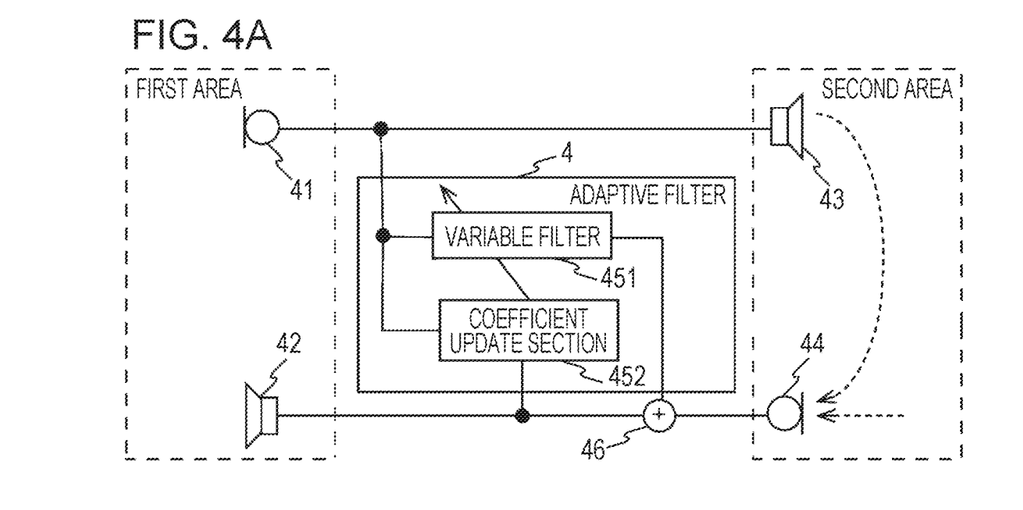
FIGS. 4A and 4B are diagrams illustrating a general echo canceling technique and an active noise control technique, respectively.

Another technique for supporting communication by speech in a car that utilizes an echo cancel technique, as illustrated in FIG. 4A, is also used. In this technique, a system for supporting conversation between a user in a first area and a user in a second area operates by outputting a user's voice picked up by a microphone 41 in the first area from a speaker 43 in the second area and outputting a user's voice picked up by a microphone 44 in the second area from a speaker 42 in the first area. Additionally, a cancel sound to cancel echoes is generated using an adaptive filter 45 and the cancel sound is added to an output of the microphone 44 in the second area by an adder 46 so that echoes that occur around to the microphone 44 in the second area from the speaker 43 in the second area are canceled (refer to JP 2010-16564 A).

In this system, in the adaptive filter 45, a coefficient update section 452 updates a filter coefficient of a variable filter 451 that generates cancel sound using the output of the microphone 41 in the first area so that a minimum error is obtained by an adaptive algorithm, such as an LMS algorithm, while it is determined that an output of the adder 46 is an error and an output of the microphone 41 in the first area is a reference signal.

Figure 4B:
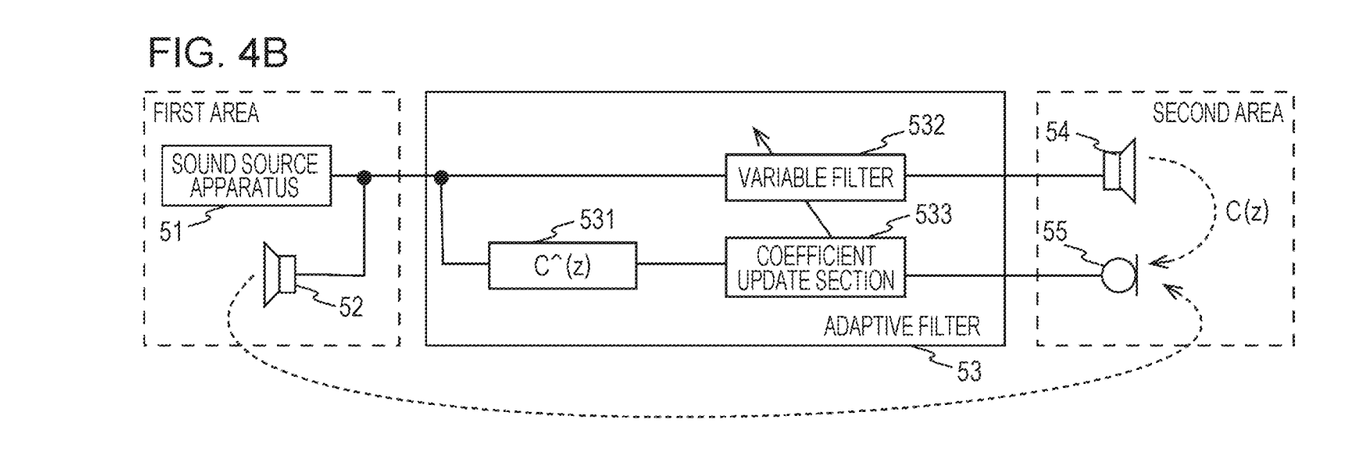

Furthermore, as illustrated in FIG. 4B, an active noise control technique of determining sound, such as music, output from a sound source apparatus 51 for the user in the first area using a speaker 52 for the user in the first area as noise for the user in the second area and outputting noise canceling sound for canceling the noise from a speaker 54 in the second area has been used (refer to JP 2010-163054 A).

The active noise control technique uses an error microphone 55 located in the second area and an adaptive filter 53. The adaptive filter 53 includes an estimation filter 531 that has a transfer function $C\hat{}(z)$ set therein, estimated as a transfer function $C(z)$ from the speaker 54 to the error microphone 55 in the second area and that receives an output of the sound source apparatus 51 as an input, a variable filter 532 that generates a noise canceling sound using the output of the sound source apparatus 51, and the coefficient update section 533. With this configuration, the coefficient update section 533 updates a filter coefficient of the variable filter 532 that generates the noise canceling sound in accordance with the Filtered-X LMS algorithm for performing an adaptive algorithm using an output of the error microphone 55 as an error and an output of the estimation filter 531 as a reference signal, so that an error is minimized.

In the system for supporting communication by speech in a car by outputting a user's voice picked up by the microphone in the first area from the speaker in the second area and outputting a user's voice picked up by the microphone in the second area from the speaker in the first area, when a location of the microphone in one of the areas and a location of the speaker in the other of the areas that outputs the voice picked up by the microphone in the one of the areas is close to each other, audio feedback may occur since sound output from the speaker in the other area comes around to the microphone in the one of the areas.

Therefore, it is conceivable to prevent audio feedback by using an adaptive filter to cancel an output sound of the speaker in the other area that comes around to the microphone in the one of the areas.

However, when the active noise control and the echo cancelation described above are to be performed in this system, an adaptive filter for suppressing audio feedback is required in addition to the adaptive filter for the active noise control and the echo cancelation, which leads to an excessive system size and an excessive processing volume.

SUMMARY

Accordingly, the present disclosure is made to suppress occurrence of audio feedback by a more efficient configuration in a communication support system for supporting communication by speech between users in different areas.

To address the above problem, according to an aspect of the present disclosure, a communication support system for supporting communication by speech between a user in a first area and a user in a second area includes a sound source apparatus, a first area speaker that is installed in the first area and that is configured to receive a sound source output sound signal corresponding to sound output from the sound source apparatus, a second area speaker installed in the second area, and a second area microphone installed in the second area, and a signal processing apparatus. The signal processing apparatus includes a noise canceling adaptive filter configured to generate a noise canceling sound signal that is applied to the second area speaker, an audio feedback canceling section configured to generate a second area speech sound signal that is added to the sound source output sound signal and that is applied to the first area speaker, and a transfer function update processing section. Furthermore, the noise canceling adaptive filter generates the noise canceling sound signal by applying a transfer function $X(z)$ adapted by an adaptive operation using a second area sound signal picked up by the second area microphone, as an error, to the sound source output sound signal to generate the noise canceling sound signal, Furthermore, the audio feedback canceling section includes a first filter, a second filter that is configured to use an output of the first filter as an input, and an adder that is configured to add the second area sound signal to an output of the second filter and to output a result of the addition as the second area speech sound signal. The first filter is configured to receive an output of the adder as an input, and a transfer function equivalent to a transfer function $C(z)$ from the second area speaker to the second area microphone is set to the second filter. The transfer function update processing section is configured to update a transfer function of the first filter to a transfer function that is the same as the transfer function X(z) adapted by the adaptive operation performed by the noise canceling adaptive filter.

Here, a first area microphone installed in the first area set in the communication support system may be provided so that a first area sound signal picked up by the first area microphone is applied to the second area speaker after being added to the noise canceling sound signal.

Moreover, the communication support system described above may be configured such that the noise canceling adaptive filter adapts the transfer function X(z) by an adaptive operation in accordance with the Filtered-X LMS algorithm using a signal obtained by applying a transfer function equivalent to the transfer function C(z) to the sound source output sound signal as a reference signal and the second area sound signal as an error.

Furthermore, to address the above problem, according to another aspect of the present disclosure, a communication support system for supporting communication by speech between a user in a first area and a user in a second area includes a sound source apparatus, a first area speaker that is installed in the first area and that is configured to receive a sound source output sound signal corresponding to sound output from the sound source apparatus, a first area microphone installed in the first area, a second area speaker that is installed in the second area and that is configured to receive a first area sound signal picked up by the first area microphone, a second area microphone installed in the second area, and a signal processing apparatus. The signal processing apparatus includes a noise canceling adaptive filter that is configured to generate a noise canceling sound signal to be applied to the second area speaker after being added to the first area sound signal, an echo canceling section, an audio feedback canceling section that is configured to generate a second area speech sound signal to be added to the sound source output sound signal and that is applied to the first area speaker, a reference signal generation filter that is configured to receive the sound source output sound signal as an input, and a transfer function update processing section. In addition, the echo canceling section includes an echo canceling adaptive filter that is configured to receive the first area sound signal as an input and an echo canceling adder that is configured to add an output of a second area sound signal picked up by the second area microphone to an echo canceling sound signal that is an output of the echo canceling adaptive filter and that is configured to output a result of the addition, where the echo canceling adaptive filter is configured to generate the echo canceling sound signal by applying a transfer function Q(z) adapted by an adaptive operation using an output of the echo canceling adder as an error to the first area sound signal. Furthermore, the reference signal generation filter is configured to share the transfer function Q(z) of the echo canceling adaptive filter as the transfer function of the reference signal generation filter, and the noise canceling adaptive filter is configured to generate the noise canceling sound signal by applying, to the sound source output sound signal, a transfer function X(z) adapted by an adaptive operation in accordance with the Filtered-X LMS algorithm using an output of the echo canceling adder as an error and an output of the reference signal generation filter as a reference signal. Moreover, the audio feedback canceling section includes a first filter, a second filter that is configured to use an output of the first filter as an input, and an audio feedback canceling adder that is configured to add an output of the echo canceling adder to an output of the second filter and to output a result of the addition as the second area speech sound signal. The first filter is configured to receive an output of the audio feedback canceling adder as an input. Then the transfer function update processing section is configured to update a transfer function of the first filter to a transfer function the same as the transfer function X(z) adapted by the adaptive operation performed by the noise canceling adaptive filter and to update a transfer function of the second filter to a transfer function the same as the transfer function Q(z) adapted by the adaptive operation performed by the echo canceling adaptive filter.

Here, the communication support system may be configured such that the echo canceling adaptive filter adapts the transfer function Q(z) by an adaptive operation in accordance with the LMS algorithm using the first area sound signal as a reference signal and an output of the echo canceling adder as an error.

Furthermore, according to the communication support systems described above, a seat in the first area and a seat in the second area in a vehicle may be different from each other.

According to the communication support system described above, since the adaptive filter for noise cancelation that cancels, in the second area, an output sound of the sound source apparatus output from the first area speaker and a transfer function of the adaptive filter that cancels echoes of a speech voice of the user in the first area that comes around to the second area microphone from the second area speaker are diverted, generation of audio feedback caused by a speech voice of the user in the second area that comes around to the second area microphone from the first area speaker may be suppressed without using a dedicated adaptive filter.

DETAILED DESCRIPTION

The following is a description of embodiments and implementations of the present disclosure, taking as an example its application to an in-vehicle system that supports communication by speech in a vehicle between front and rear seats of a car.

First, a first embodiment will be described.

Figure 1A:
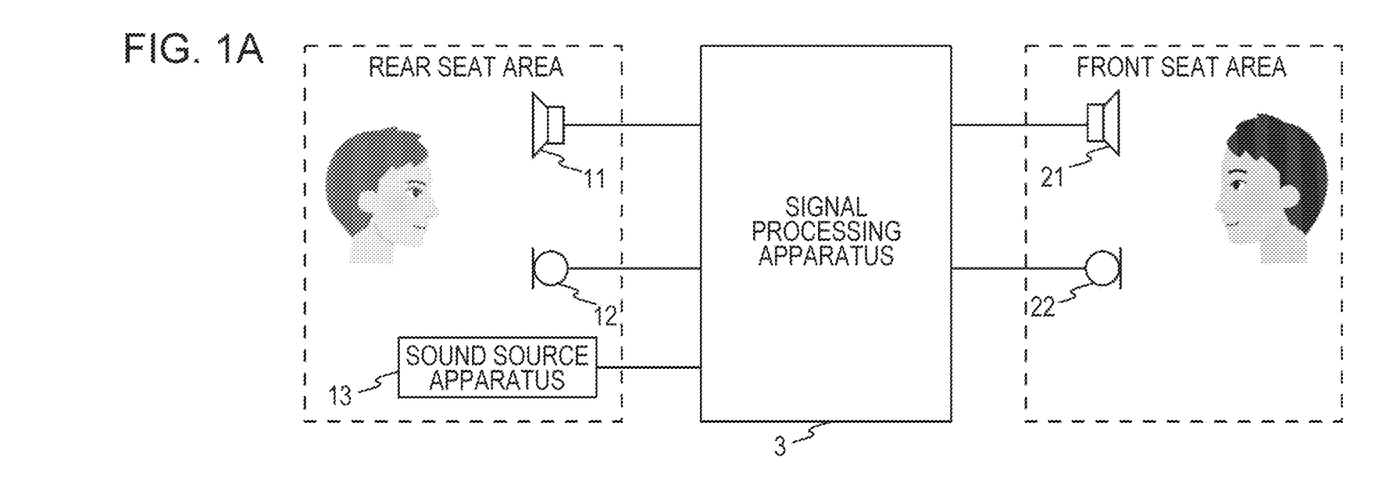
FIGS. 1A and 1B are block diagrams illustrating a configuration of an in-vehicle system according to a first embodiment of the present disclosure.

FIG. 1A is a diagram illustrating a configuration of an in-vehicle system according to the first embodiment.

As illustrated in the figure, the in-vehicle system includes a rear seat speaker 11 which is a speaker for a user in a rear seat area in a car, a rear seat microphone 12 which is a microphone for the user in the rear seat area, a sound source apparatus 13 for the user in the rear seat area, a front seat speaker 21 which is a speaker for a user in a front seat area in the car, a front seat microphone 22 which is a microphone for the user in the front seat area, and a signal processing apparatus 3 to which the above components are connected.

The signal processing apparatus 3 outputs voice of the user in the rear seat area, picked up by the rear seat microphone 12 in the rear seat area, to the front seat speaker 21 in the front seat area, and outputs voice of the user in the front seat area, picked up by the front seat microphone 22 in the front seat area, to the rear seat speaker 11 in the rear seat area, so as to support communication by conversation between the user in the rear seat area and the user in the front seat area.

Figure 1B:
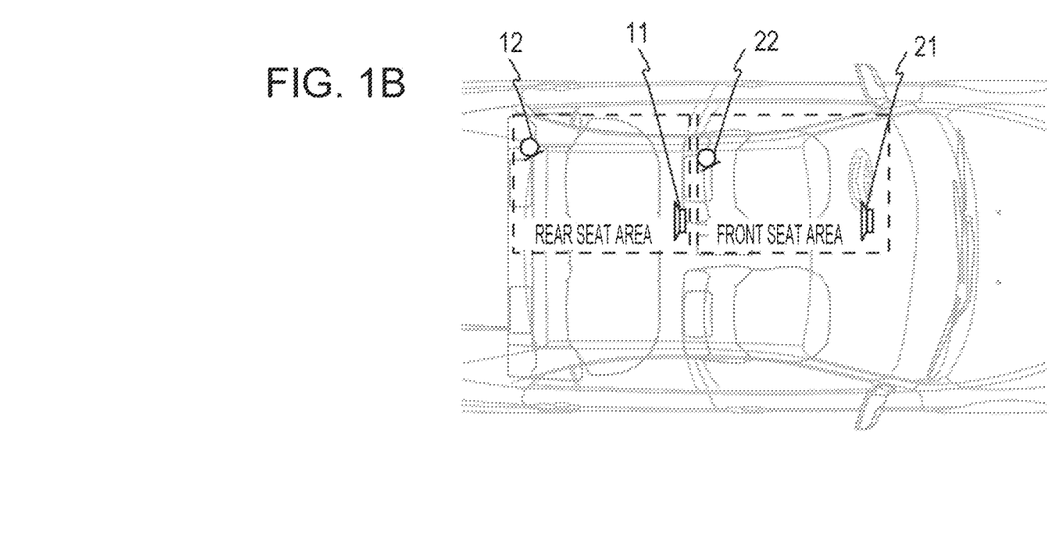

Here, as illustrated in FIG. 1B, the rear seat area is, for example, an area behind a driver's seat of a car, and the rear seat speaker 11 and the rear seat microphone 12 are located in the rear seat area. Furthermore, the front seat area is, for example, a driver's seat area of the car, and the front seat speaker 21 and the front seat microphone 22 are located in the front seat area.

Furthermore, as illustrated in the figure, the rear seat speaker 11 and the front seat microphone 22 are located relatively close to each other, and the signal processing apparatus 3 cancels an output sound of the rear seat speaker 11 that comes around to the front seat microphone 22 to suppress generation of audio feedback caused by the output sound of the rear seat speaker 11 that comes around to the front seat microphone 22.

Furthermore, the signal processing apparatus 3 outputs an output sound of the sound source apparatus 13 to the rear seat speaker 11 in the rear seat area, and also outputs, from the front seat speaker 21 in the front seat area, a noise canceling sound for canceling the output sound of the sound source apparatus 13 output from the rear seat speaker 11 in a position of the user in the front seat area so as to suppress disturbance of the user in the front seat area by the output sound of the sound source apparatus 13 that the user in the rear seat area is listening to.

Figure 2:
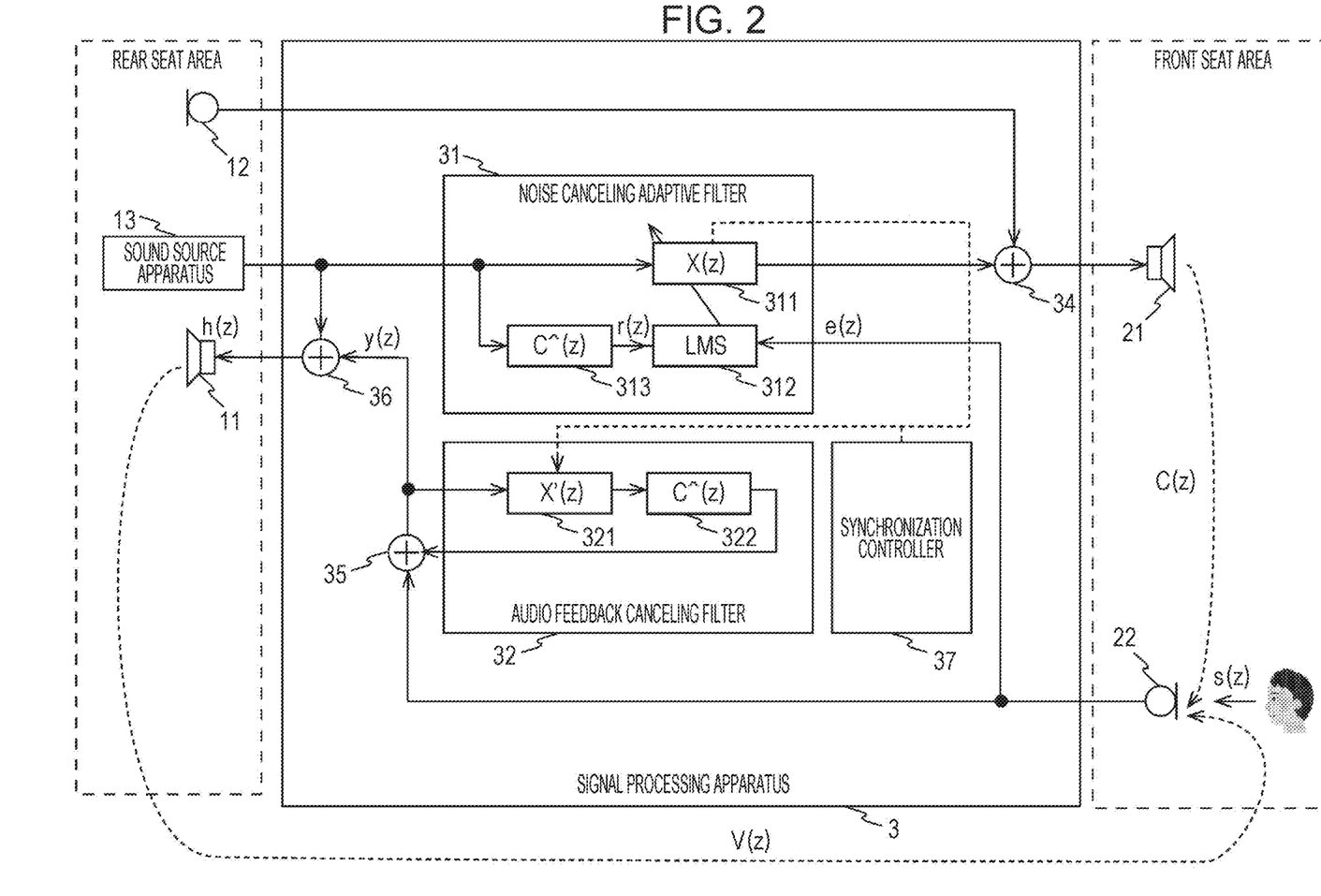
FIG. 2 is a block diagram illustrating a configuration of a signal processing apparatus according to the first embodiment of the present disclosure.

Next, FIG. 2 is a diagram illustrating a configuration of the signal processing apparatus 3.

As illustrated in the figure, the signal processing apparatus 3 includes a noise canceling adaptive filter 31, an audio feedback canceling filter 32, a first adder 34, a second adder 35, a third adder 36, and a synchronization controller 37.

An output of the rear seat microphone 12 is transmitted to the first adder 34 and added by the first adder 34 to the noise canceling sound output from the noise canceling adaptive filter 31. A resultant sound is output from the front seat speaker 21.

The output of the front seat microphone 22 is transmitted to the third adder 36 after being transmitted to the second adder 35 and added to an output of the audio feedback canceling filter 32 by the second adder 35. The third adder 36 adds a resultant to an output of the sound source apparatus 13 and outputs a resultant sound to the rear seat speaker 11.

Here, the noise canceling adaptive filter 31 includes a noise canceling variable filter 311, a noise canceling adaptive algorithm executor 312, and a reference signal generation filter 313.

The noise canceling variable filter 311 receives an output of the sound source apparatus 13 as an input, and an output of the noise canceling variable filter 311 is supplied to the first adder 34 as a noise canceling sound.

The reference signal generation filter 313 that has a transfer function $\hat{C}(z)$ set in advance therein that is the same as a transfer function $C(z)$ from the front seat speaker 21 to the front seat microphone 22 applies the transfer function $\hat{C}(Z)$ to the output of the sound source apparatus 13 so as to obtain a reference signal $r(z)$ to be output to the noise canceling adaptive algorithm executor 312.

The output of the reference signal generation filter 313 is input to the noise canceling adaptive algorithm executor 312 as the reference signal $r(z)$, and in addition, an output of the front seat microphone 22 is also input as an error $e(z)$. The noise canceling adaptive algorithm executor 312 performs an adaptive operation of updating a transfer function $X(z)$ of the noise canceling variable filter 311 so as to minimize power of the error $e(z)$ in accordance with the Filtered-X LMS algorithm.

More specifically, the noise canceling adaptive algorithm executor 312 updates a transfer function $X(n)$ of the noise canceling variable filter 311 in accordance with the following equation:

$$X(n+1)=X(n)+\mu e(n)r(n)$$

where $X(n)$ denotes a transfer function of the noise canceling variable filter at a time point n, $\mu$ denotes a step size parameter, $e(n)$ denotes an output of the front seat microphone 22 at the time point n, and $r(n)$ denotes a reference signal output from the reference signal generation filter 313 at the time point n, for example.

Assuming that $V(z)$ denotes a transfer function from the rear seat speaker 11 to the front seat microphone 22, when only an output sound of the sound source apparatus 13 is output from the rear seat speaker 11 and only an output sound of the rear seat speaker 11 is collected by the front seat microphone 22, $e(z)=0$ is attained when "$X(z)=-V(z)C(z)-1$" is satisfied, and therefore, the transfer function $X(z)$ of the noise canceling variable filter 311 is converged to $-V(z)C(z)-1$ by the adaptive operation described above.

The audio feedback canceling filter 32 includes a first filter 321 and a second filter 322.

An output of the front seat microphone 22 is added to an output of the audio feedback canceling filter 32 by the second adder 35, an output of the second adder 35 serves as an input of the audio feedback canceling filter 32, and the output of the second adder 35 serves as an output of the audio feedback canceling filter 32 through the first filter 321 and the second filter 322.

A transfer function $X'(z)$ set in the first filter 321 is the same as the transfer function $X(z)$ of the noise canceling variable filter 311.

The transfer function $X'(z)$ of the first filter 321 is set when the synchronization controller 37 updates the transfer function $X'(z)$ of the first filter 321 to a transfer function the same as the transfer function $X(z)$ of the noise canceling variable filter 311 as needed.

The second filter 322 has a transfer function $\hat{C}(z)$ that is the same as the transfer function $C(z)$ obtained in advance.

Therefore, assuming that an output of the second adder 35 is denoted by $y(z)$, an output of the rear seat speaker 11 is denoted by $h(z)$, and a speech voice of the user in the front seat area collected by the front seat microphone 22 is denoted by $s(z)$, an output sound of the rear seat speaker 11 that comes around to the front seat microphone 22 is denoted by $h(z)V(z)$, and therefore, an output of the front seat microphone 22 obtained when sound does not come around to the front seat microphone 22 from the front seat speaker 21 is denoted by $s(z)+h(z)V(z)$.

Furthermore, since an output of the audio feedback canceling filter 32 is denoted by $y(z)X'(z)\hat{C}(z)$, an output $y(z)$ of the second adder 35 is expressed as follows.

$$y(z)=s(z)+h(z)V(z)+y(z)X'(z)\hat{C}(z)$$

$$\hat{C}(z)=C(z)$$

$$X'(z)=X(z)=-V(z)C(z)-1$$

Since the above equations are satisfied, the following expression is satisfied.

$$y(z) = s(z) + h(z)V(z) + y(z)\{-V(z)C(z) - 1C^\wedge(z)\} =$$
$$s(z) + h(z)V(z) + y(z)\{-V(z)\} = s(z) + \{h(z) - y(z)\}V(z)$$

Here, when "h(z)=y(z)" is satisfied, "y(z)=s(z)" is attained, and the output sound h(z)V(z) of the rear seat speaker 11 that comes around to the front seat microphone 22, which causes audio feedback, is canceled.

When there is no output sound of the sound source apparatus 13, as expressed by the equation "h(z)=y(z)", a component of the output sound h(z)V(z) of the rear seat speaker 11 that comes around to the front seat microphone 22 is canceled from an output of the front seat microphone 22 and occurrence of audio feedback is suppressed by operations of the audio feedback canceling filter 32 and the second adder 35.

The first embodiment of the present disclosure has been described hereinabove.

Next, a second embodiment of the present disclosure will be described.

Figure 3:
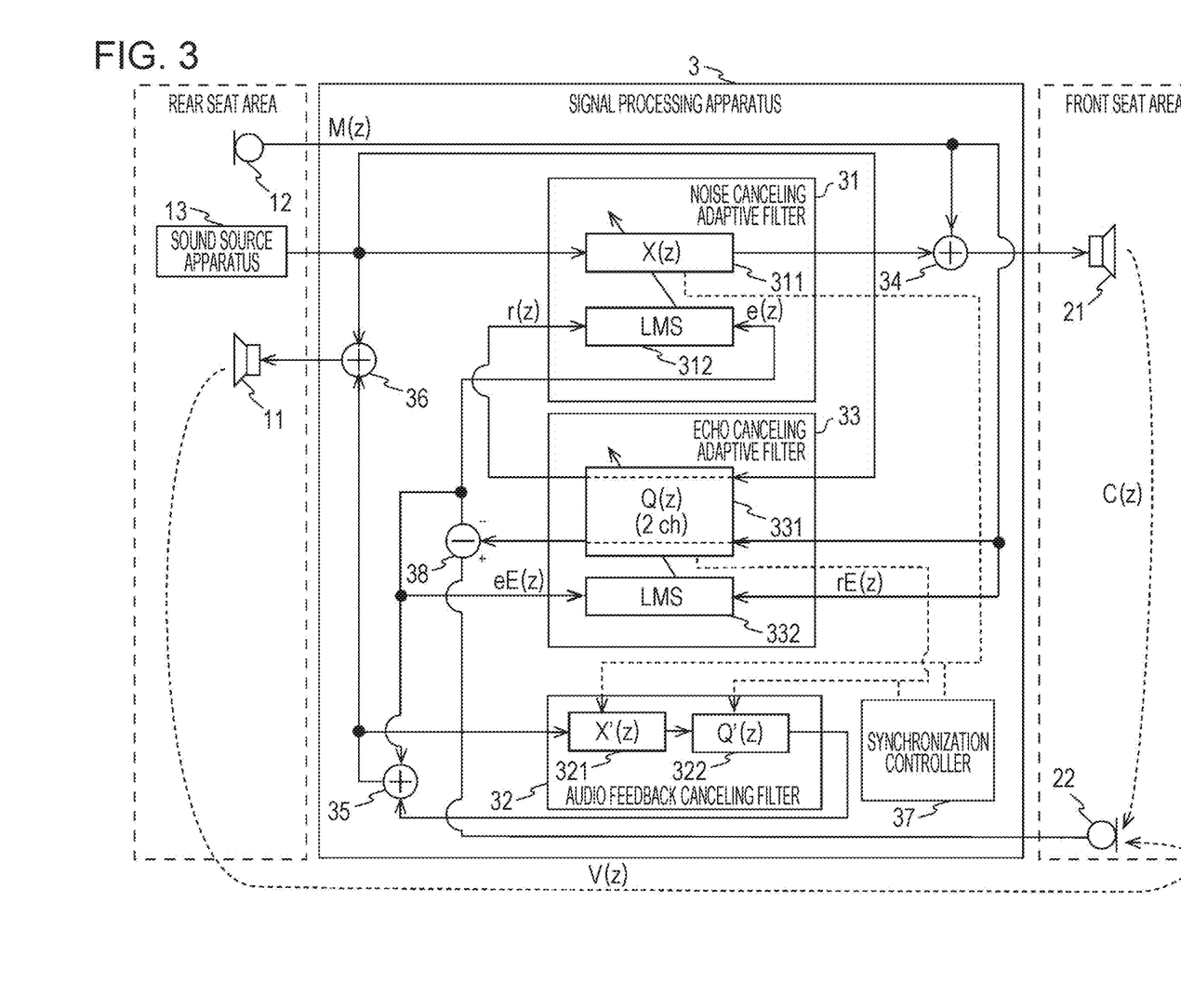
FIG. 3 is a block diagram illustrating a configuration of a signal processing apparatus according to a second embodiment of the present disclosure.

The second embodiment is different from the first embodiment in that a signal processing apparatus 3 has, in addition to the function of the signal processing apparatus 3 according to the first embodiment, a function of canceling echoes of a speech voice in a rear seat area output from the front seat speaker 21 that comes around to the front seat microphone 22, and only a portion of a configuration of the signal processing apparatus 3 is different from the first embodiment.

FIG. 3 is a diagram illustrating a configuration of the signal processing apparatus 3 according to the second embodiment.

Hereinafter, portions of the signal processing apparatus 3 according to the second embodiment that are different from the signal processing apparatus 3 according to the first embodiment will be described.

As illustrated in the figure, the signal processing apparatus 3 according to the second embodiment includes an echo canceling adaptive filter 33 and a subtractor 38 as a configuration for echo cancelation.

The echo canceling adaptive filter 33 has an echo canceling variable filter 331 and an echo canceling adaptive algorithm executor 332. The echo canceling variable filter 331 is a two-channel variable filter with two signal processing systems, and individual channels have the same transfer function set by the echo canceling adaptive algorithm executor 332. In other words, the echo canceling variable filter 331 is equivalent to two variable filters with the same transfer function set by the echo canceling adaptive algorithm executor 332.

A first channel of the echo canceling variable filter 331 receives an output of a rear seat microphone 12 as an input, and an output of the first channel is supplied to a subtractor 38 as an echo canceling sound. Furthermore, a second channel of the echo canceling variable filter 331 receives an output of a sound source apparatus 13 as an input, and an output of the second channel is supplied to a noise canceling adaptive filter 31.

The subtractor 38 subtracts, from an output of the rear seat microphone 12, the echo canceling sound output by the first channel of the echo canceling variable filter 331 and outputs a resultant sound.

An echo canceling adaptive algorithm executor 332 uses an output of the subtractor 38 as an error eE(z) and an output of the rear seat microphone 12 as a reference signal rE(z) to update a transfer function Q(z) of the first channel of the echo canceling variable filter 331 so that the power of the error eE(z) is minimized by using the LMS algorithm or the like. Furthermore, a transfer function Q(z) of the first channel is shared as a transfer function of the second channel, and as the transfer function Q(z) of the first channel is updated, the transfer function of the second channel is also updated so as to be equal to the transfer function Q(z) of the first channel.

Therefore, the echo canceling sound output by the first channel of the echo canceling variable filter 331 is used to cancel an echo that is an output sound component of the rear seat microphone 12 included in an output of the front seat microphone 22 by the subtraction performed by the subtractor 38.

Assuming here that an output of the rear seat microphone 12 is denoted by M(z), an error eE(z) associated with M(z) output from the subtractor 38 to the echo canceling adaptive algorithm executor 332 is represented as follows.

$$eE(z)=M(z)C(z)-M(z)Q(z)$$

When the transfer functions of the first and second channels of the echo canceling variable filter 331 are converged by an operation of the echo canceling adaptive algorithm executor 332 so that "eE(z)=0" is attained, the following expression is obtained.

$$eE(z)=M(z)C(z)-M(z)Q(z)=0$$

$$Q(z)=C(z)$$

Here, an output of the subtractor 38 is output from the rear seat speaker 11 through a second adder 35 and a third adder 36. Furthermore, the output of the subtractor 38 is also supplied to the noise canceling adaptive filter 31.

Next, the noise canceling adaptive filter 31 of the second embodiment is configured such that the reference signal generation filter 313 is eliminated from the noise canceling adaptive filter 31 of the first embodiment illustrated in FIG. 2, and the noise canceling adaptive algorithm executor 312 receives a signal of the second channel of the echo canceling variable filter 331, instead of an output of the reference signal generation filter 313, as a reference signal r(z). Furthermore, although the noise canceling adaptive filter 31 according to the first embodiment determines an output of the front seat microphone 22 as the error e(z) in the first embodiment, this is changed in the second embodiment such that the noise canceling adaptive filter 31 according to the second embodiment determines an output of the subtractor 38, that is, voice obtained by canceling echoes of a speech voice of a user in a rear seat area from an output of the front seat microphone 22, as the error e(z) to be input to the noise canceling adaptive algorithm executor 312.

As described above, the second channel of the echo canceling variable filter 331 receives an output of the sound source apparatus 13 as an input and has a transfer function Q(z) that satisfies "Q(z)=C(z)", and therefore, the reference signal r(z) input to the noise canceling adaptive algorithm executor 312 is the same as that in the first embodiment. The speech voice of the user in the rear seat area, which is canceled as an echo by the subtractor 38, is uncorrelated with the output sound of the sound source apparatus 13.

Therefore, the transfer function X(z) of the noise canceling variable filter 311 is represented as "X(z)=−V(z)C(z)−1" as in the first embodiment, and a noise canceling sound that cancels the output sound of the sound source apparatus 13 output from the rear seat speaker 11 is generated by the noise canceling variable filter 311 in a position of the user in a front seat area and is output from the front seat speaker 21 in the front seat area via a first adder 34.

Next, although the output of the front seat microphone 22 is used as an input of the second adder 35 in the first embodiment, this is changed in the second embodiment such that the output of the subtractor 38, that is, voice obtained by canceling echoes of a speech voice of the user in the rear seat area from the output of the front seat microphone 22 is used as the input of the second adder 35.

In other words, the output of the subtractor 38 is added to the output of the audio feedback canceling filter 32 in the second adder 35, and an output of the second adder 35 serves as an input of the audio feedback canceling filter 32. The output of the second adder 35 serves as the input of the audio feedback canceling filter 32, and the output of the second adder 35 serves as the input of the audio feedback canceling filter 32. The output of the second adder 35 serves as an output of the audio feedback canceling filter 32 through the first filter 321 and the second filter 322. The output of the second adder 35 is added to the output of the sound source apparatus 13 by the third adder 36, and a resultant is output to the rear seat speaker 11.

Furthermore, according to the second embodiment, the synchronization controller 37 appropriately updates a transfer function $X'(z)$ of the first filter 321 by a transfer function the same as a transfer function $X(z)$ of the noise canceling variable filter 311, and updates a transfer function $Q'(z)$ of the second filter 322 by a transfer function the same as a transfer function $Q(z)$ of the echo canceling variable filter 331.

Here, as described above, the transfer function $Q(z)$ of the echo canceling variable filter 331 satisfies "$Q(z)=C(z)$", and a transfer function the same as that in the first embodiment is set in the first filter 321 and the second filter 322 also in the second embodiment since the transfer function $X(z)$ of the noise canceling variable filter 311 satisfies "$X(z)=-V(z)C(z)-1$", and occurrence of audio feedback is suppressed.

Embodiments of the present disclosure have been described hereinabove.

As described above, according to the described embodiments, audio feedback may be canceled, without a dedicated adaptive filter, by diverting a transfer function of an adaptive filter for noise cancelation or echo cancelation.

Here, a configuration in which echoes that come around to the front seat microphone 22 from the front seat speaker 21 of the signal processing apparatus 3 described above and a symmetrical configuration of the rear seat area and the front seat area may be added to the signal processing apparatus 3 in the second embodiment described above so that voice picked up by the rear seat microphone 12 in the rear seat area is output to the front seat speaker 21 after the echoes that come around to the rear seat microphone 12 from the rear seat speaker 11 is canceled.

Furthermore, in the first and second embodiments described above, a configuration in which a second sound source apparatus for the user in the front seat area is disposed, an output sound of the sound source apparatus 13 of the signal processing apparatus 3 described above is output to the rear seat speaker 11, and a noise canceling sound for canceling an output sound of the sound source apparatus 13 output from the rear seat speaker 11 in a position of the user in the front seat area is output from the front seat speaker 21 and a symmetrical configuration of the rear seat area and the front seat area may be added to the signal processing apparatus 3, so that an output sound of the second sound source apparatus is output to the front seat speaker 21, and noise canceling sound for canceling an output sound of the sound source apparatus 13 output from the front seat speaker 21 in a position of the user in the rear seat area may be output from the rear seat speaker 11.

In addition, in the first and second embodiments described above, a configuration in which audio feedback caused by sound that comes around to the front seat microphone 22 from the rear seat speaker 11 of the signal processing apparatus 3 is canceled and the symmetrical configuration of the rear seat area and the front seat area described above may be added to the signal processing apparatus 3 so that audio feedback caused by sound that comes around to the rear seat microphone 12 from the front seat speaker 21 is canceled.

Furthermore, although the above embodiments have been described using the example of application to support communication by speech between the front and rear seats, the above embodiments can be equally applied to support communication by speech between seats for any combination of seats other than the front and rear seats.

In addition, although the above description is based on the example of application to support communication by speech in a car, each of the foregoing embodiments may be similarly applied even when each area is outside of a car.

Although the number of areas is set to 2 in the foregoing embodiments, the embodiments may be expanded and implemented for three or more areas.

Although embodiments and implementations of the present disclosure have been described in detail above, the present disclosure is not limited to the specific embodiments, and various modifications and changes can be made within the scope of the disclosure set forth in the claims. Therefore, it is intended that this disclosure not be limited to the particular embodiments disclosed, but that the disclosure will include all embodiments and implementations falling within the scope of the appended claims.

The invention claimed is:

1. A communication support system for supporting communication by speech between a user in a first area and a user in a second area, the communication support system comprising:
    a sound source apparatus;
    a first area speaker that is installed in the first area and that is configured to receive a sound source output sound signal corresponding to sound output from the sound source apparatus;
    a second area speaker installed in the second area;
    a second area microphone installed in the second area; and
    a signal processing apparatus, comprising:
        a noise canceling adaptive filter configured to generate a noise canceling sound signal that is applied to the second area speaker,
        an audio feedback canceling section configured to generate a second area speech sound signal that is added to the sound source output sound signal and that is applied to the first area speaker, and
        a transfer function update processing section,
    wherein the noise canceling adaptive filter is configured to generate the noise canceling sound signal by applying a transfer function $X(z)$ adapted by an adaptive operation using a second area sound signal picked up by the second area microphone, as an error, to the sound source output sound signal to generate the noise canceling sound signal, wherein the audio feedback canceling section includes a first filter, a second filter that is configured to use an output of the first filter as an input, and an adder that that is configured to add the second area sound signal to an output of the second filter and to output a result of the addition as the second area speech sound signal, wherein the first filter is configured to receive an output of the adder as an input, wherein the second filter has a transfer function equivalent to a transfer function $C(z)$ from the second area speaker to the second area microphone, and wherein the transfer function update processing section is configured to update a transfer function of the first filter to a transfer function that is the same as the transfer function $X(z)$ adapted by the adaptive operation performed by the noise canceling adaptive filter.

2. The communication support system according to claim 1, further comprising:

a first area microphone installed in the first area, wherein a first area sound signal picked up by the first area microphone is applied to the second area speaker after being added to the noise canceling sound signal.

3. The communication support system according to claim 1, wherein:

the noise canceling adaptive filter is configured to adapt the transfer function $X(z)$ by an adaptive operation in accordance with a Filtered-X LMS algorithm using a signal obtained by applying a transfer function equivalent to the transfer function $C(z)$ to the sound source output sound signal as a reference signal and the second area sound signal as an error.

4. The communication support system according to claim 3, wherein:

a seat in the first area and a seat in the second area in a vehicle are different from each other.

5. A communication support system for supporting communication by speech between a user in a first area and a user in a second area, the communication support system comprising:

a sound source apparatus;

a first area speaker that is installed in the first area and that is configured to receive a sound source output sound signal corresponding to sound output from the sound source apparatus;

a first area microphone installed in the first area;

a second area speaker that is installed in the second area and that is configured to receive a first area sound signal picked up by the first area microphone;

a second area microphone installed in the second area; and a signal processing apparatus, comprising:

a noise canceling adaptive filter configured to generate a noise canceling sound signal that is applied to the second area speaker after being added to the first area sound signal, an echo canceling section, an audio feedback canceling section configured to generate a second area speech sound signal that is added to the sound source output sound signal that is applied to the first area speaker, a reference signal generation filter configured to receive the sound source output sound signal as an input, and a transfer function update processing section, wherein the echo canceling section includes an echo canceling adaptive filter configured to receive the first area sound signal as an input and an echo canceling adder configured to add an output of a second area sound signal picked up by the second area microphone to an echo canceling sound signal that is an output of the echo canceling adaptive filter and to output a result of the addition, wherein the echo canceling adaptive filter is configured to generate the echo canceling sound signal by applying a transfer function $Q(z)$ adapted by an adaptive operation using an output of the echo canceling adder as an error to the first area sound signal, wherein the reference signal generation filter is configured to share the transfer function $Q(z)$ of the echo canceling adaptive filter as the transfer function of the reference signal generation filter, wherein the noise canceling adaptive filter is configured to generate the noise canceling sound signal by applying, to the sound source output sound signal, a transfer function $X(z)$ adapted by an adaptive operation in accordance with the Filtered-X LMS algorithm using an output of the echo canceling adder as an error and an output of the reference signal generation filter as a reference signal, wherein the audio feedback canceling section includes a first filter, a second filter configured to use an output of the first filter as an input, and an audio feedback canceling adder configured to add an output of the echo canceling adder to an output of the second filter and to output a result of the addition as the second area speech sound signal, wherein the first filter is configured to receive an output of the audio feedback canceling adder as an input, and wherein the transfer function update processing section is configured to update a transfer function of the first filter to a transfer function the same as the transfer function $X(z)$ adapted by the adaptive operation performed by the noise canceling adaptive filter and to update a transfer function of the second filter to a transfer function that is the same as the transfer function $Q(z)$ adapted by the adaptive operation performed by the echo canceling adaptive filter.

6. The communication support system according to claim 5, wherein:

the echo canceling adaptive filter is configured to adapt the transfer function $Q(z)$ by an adaptive operation in accordance with the LMS algorithm using the first area sound signal as a reference signal and an output of the echo canceling adder as an error.

7. The communication support system according to claim 6, wherein:

a seat in the first area and a seat in the second area in a vehicle are different from each other.

* * * * *